US007025085B2

(12) United States Patent
Price et al.

(10) Patent No.: US 7,025,085 B2
(45) Date of Patent: Apr. 11, 2006

(54) RADIAL POPPET-TYPE CHECK VALVE WITH CLOSURE ASSIST FEATURE

(75) Inventors: Timothy D. Price, Monroe, NC (US); Robert V. Funderburk, Salisbury, NC (US); Gareth P. Taylor, Indian Trail, NC (US)

(73) Assignee: Conbraco Industries, Inc., Matthews, NC (US)

( * ) Notice: Subject to any disclaimer, the term of this patent is extended or adjusted under 35 U.S.C. 154(b) by 175 days.

(21) Appl. No.: 10/796,241

(22) Filed: Mar. 9, 2004

(65) Prior Publication Data
US 2005/0199291 A1    Sep. 15, 2005

(51) Int. Cl.
F16K 15/00    (2006.01)
(52) U.S. Cl. ...................... 137/512; 137/529; 137/536; 251/337
(58) Field of Classification Search ................ 137/512, 137/529, 536; 251/337
See application file for complete search history.

(56) References Cited
U.S. PATENT DOCUMENTS
1,152,280 A * 8/1915 Boy ........................... 137/529

6,443,184 B1    9/2002 Funderburk

* cited by examiner

Primary Examiner—Stephen Blau
Assistant Examiner—Craig Price
(74) Attorney, Agent, or Firm—Adams Evans P.A.

(57) ABSTRACT

A poppet-type check valve for controlling fluid flow, and including a valve housing having an interior and first and second ports therein communicating with the interior of the valve housing for permitting fluid flow from an upstream side to a downstream side thereof. At least one valve assembly is disposed within the interior of the valve housing for controlling the fluid flow therethrough. The valve assembly includes a valve seat positioned in the interior of the valve housing and a seal retainer positioned in the interior of the valve housing downstream from the valve seat and mounted on a stem. The seal retainer and the stem are axially moveable away from the valve seat in response to fluid flow in a downstream direction at a predetermined flow rate, and axially moveable towards and into sealing engagement with the valve seat in response to a downstream fluid flow at a flow rate less than the predetermined flow rate. A plurality of springs is allowed to compress past the position of neutral load for the purpose of elongating the stroke of the poppet. The elongated stroke results in enhanced flow performance.

10 Claims, 14 Drawing Sheets

RADIAL POPPET-TYPE CHECK VALVE WITH CLOSURE ASSIST FEATURE

TECHNICAL FIELD AND BACKGROUND OF THE INVENTION

This invention relates to a type of valve known as a "backflow preventer check valve." These types of check valves are well known and are widely used to control backflow of fluids carrying undesirable contaminants into a fluid supply. These valves have evolved to become highly specialized in their function and operation, and are similar in that they all contain spring-loaded members which are biased towards the valve-closed position until fluid pressure acting on the checking members forces the valves open. Although the invention of the present application may be used in any suitable environment in which the flow of liquids must be controlled, the invention is preferably intended for use on a backflow preventer, which is a well-known device commonly used to protect potable water supplies from pollutants originating from downstream sources.

Many prior art spring-loaded check valves are of a poppet type, and include checking members whose movement is linear and remain in the fluid path. The pressure required to open such check valves is established by regulation and provides a minimum degree of protection against reverse flow. To provide some degree of protection, the springs in spring-loaded check valves provide a static differential pressure drop and corresponding static energy while the check valves are in a closed, or "no flow," condition. The pressure and corresponding energy required to open these check valves is provided by the fluid and is created at the source by, for example, a pump. As fluid flows through the valve, both the differential pressure drop and corresponding energy change from static to dynamic. The total dynamic energy of the fluid in motion through the check valves is reduced by friction within the pipes and other obstacles (including the checking members) which remain disposed directly in the fluid path within the fluid conduit system. Once it increases beyond a certain amount, this loss of dynamic energy, also known as "headloss," is no longer beneficial. Due to the position and linear movement of the springs within typical spring-loaded check valves, as headloss increases, fluid pressure decreases. This results in reduced fluid flow.

Applicant's prior U.S. Pat. No. 6,443,184 provides significant improvement in the operation of radial-loaded poppet-type valves by providing a plurality of springs pivotally mounted in the interior of the valve housing and interconnecting the valve housing and stem for normally maintaining the seal retainer in sealing engagement with the valve seat in the absence of fluid flow. The springs are positioned in a radial position and extend outwardly from the stem towards the edge of the seal retainer to cause the seal retainer to move away from the valve seat in response to fluid flow in the downstream direction. This movement thereby increases the force of the stem on the springs and causes the springs to pivot and compress to produce a diminishing resultant spring load on the stem. This valve provides the required axial load when the poppet is in the closed, no-flow condition. However, as flow commences, the axial load diminishes and approaches zero. Some embodiments, such as tubes with small orifices will benefit if the load diminishes and the poppet stroke is extended to allow a smoother flow path.

The invention of the present application provides a further advantageous function by allowing the poppet to have an extended stroke past the neutral position, thus enhancing the flow characteristics of the valve.

SUMMARY OF THE INVENTION

Therefore, it is an object of the invention to provide a poppet-type check valve having springs positioned to allow spring loading to decrease as the check valve opens.

It is another object of the invention to provide a radially loaded, poppet-type check valve wherein a biasing member, for example, a spring-loaded stem, is provided to prevent the seal retainer from sticking in the open position.

It is another object of the invention to provide a poppet-type check valve which provides a static differential pressure drop for providing protection against reverse fluid flow, and an anti-sticking feature.

It is another object of the invention to provide a poppet-type check valve that allows the resultant force of the springs acting on the poppet to be adequate when the check valve is closed in a static, "no-flow" condition, and then to decrease as fluid flow increases and the check valve opens.

These and other objects of the present invention are achieved in the preferred embodiments disclosed below by providing a poppet-type check valve for controlling fluid flow, and comprising a valve housing having an interior and first and second ports therein communicating with the interior of the valve housing for permitting fluid flow from an upstream side to a downstream side thereof. At least one valve assembly is disposed within the interior of the valve housing for controlling the fluid flow therethrough. The valve assembly includes a valve seat positioned in the interior of the valve housing and a seal retainer positioned in the interior of the valve housing downstream from the valve seat and mounted on a stem. The seal retainer and the stem are axially moveable away from the valve seat in response to fluid flow in a downstream direction at a predetermined flow rate, and axially moveable towards and into sealing engagement with the valve seat in response to a downstream fluid flow at a flow rate less than the predetermined flow rate. A plurality of springs are pivotally mounted in the interior of the valve housing interconnecting the valve housing and stem for normally maintaining the seal retainer in sealing engagement with the valve seat in the absence of the predetermined fluid flow rate. The springs are positioned in radial opposition to one another and extend outwardly from the stem in the downstream direction to cause the seal retainer to move away from the valve seat in response to fluid flow in the downstream direction, thereby increasing the force of the stem on the springs and causing the springs to pivot and compress to produce a diminishing resultant spring load on the stem. A return biasing member is mounted on the stem for providing a return motion to the plurality of springs, the biasing force of the biasing member providing an assist to the motion of the stem in the upstream direction upon a predetermined reduction in fluid flow to assist in returning the seal retainer into sealing engagement with the valve seat.

According to one preferred embodiment of the invention, a poppet-type check valve for controlling fluid flow comprises a valve housing having an interior and first and second ports therein communicating with the interior of the valve housing for permitting fluid flow from an upstream side to a downstream side thereof and at least one valve assembly disposed within the interior of the valve housing for controlling the fluid flow therethrough. The valve assembly includes a valve seat positioned in the interior of the valve housing and a stem guide mounted on a downstream side of the valve seat and carrying an axially-mounted stem mounted for sliding movement therein. A seal retainer is positioned in the interior of the valve housing downstream from the valve seat and mounted on the stem. The seal retainer and the stem are axially moveable away from the valve seat in response to fluid flow in a downstream direction at a predetermined flow rate, and axially moveable towards and into sealing engagement with the valve seat in response to a downstream fluid flow at a flow rate less than the predetermined flow rate. A plurality of springs are pivotally mounted in the interior of the valve housing interconnecting the valve housing and stem for normally maintaining the seal retainer in sealing engagement with the valve seat in the absence of the predetermined fluid flow rate. The springs are positioned in radial opposition to one another and extend outwardly from the stem in the downstream direction to cause the seal retainer to move away from the valve seat in response to fluid flow in the downstream direction, thereby increasing the force of the stem on the springs and causing the springs to pivot and compress to produce a diminishing resultant spring load on the stem. A return biasing member is mounted on the stem for providing a return motion to the plurality of springs. The biasing force of the biasing member provides an assist to the motion of the stem in the upstream direction upon a predetermined reduction in fluid flow to assist in returning the seal retainer into sealing engagement with the valve seat.

According to one preferred embodiment of the invention, each of the springs is positioned for being axially compressed and expanded between two angles responsive to the movement of the seal retainer, each of the angles oblique to the direction of fluid flow through the valve housing.

According to another preferred embodiment of the invention, the valve assembly includes three springs, each of the springs having first and second ends.

According to another preferred embodiment of the invention, the springs are positioned in equally-spaced relation to one another.

According to yet another preferred embodiment of the invention, the first ends are positioned on the stem in equally-spaced relation to one another, and the second ends are positioned 120 degrees apart from one another and extend downstream from the first ends.

According to yet another preferred embodiment of the invention, the biasing member comprises a return spring positioned concentrically around the stem downstream from the plurality of springs and upstream from the seal retainer.

According to yet another preferred embodiment of the invention, the biasing member is positioned and captured within a collar assembly mounted concentrically around the stem downstream from the plurality of springs and upstream from the seal retainer. The collar assembly mounted for sliding movement on the stem between a sealing position wherein the seal retainer is sealed against the valve seat and the return spring is in an expanded condition and the collar assembly is out of biasing contact with the stem, and a flow position wherein the seal retainer is spaced-apart from the valve seat to permit fluid flow through the valve, the return spring is in a compressed condition and the collar assembly is in engagement with the springs for exerting a biasing force against the stem in an upstream direction for providing an assist to the springs in closing the valve responsive to a drop in flow pressure through the valve.

According to yet another preferred embodiment of the invention, each of the springs are mounted on first and second ends by respective first and second hinges.

According to yet another preferred embodiment of the invention, the first hinge is carried by the stem and the second hinge is carried peripherally by the valve seat.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
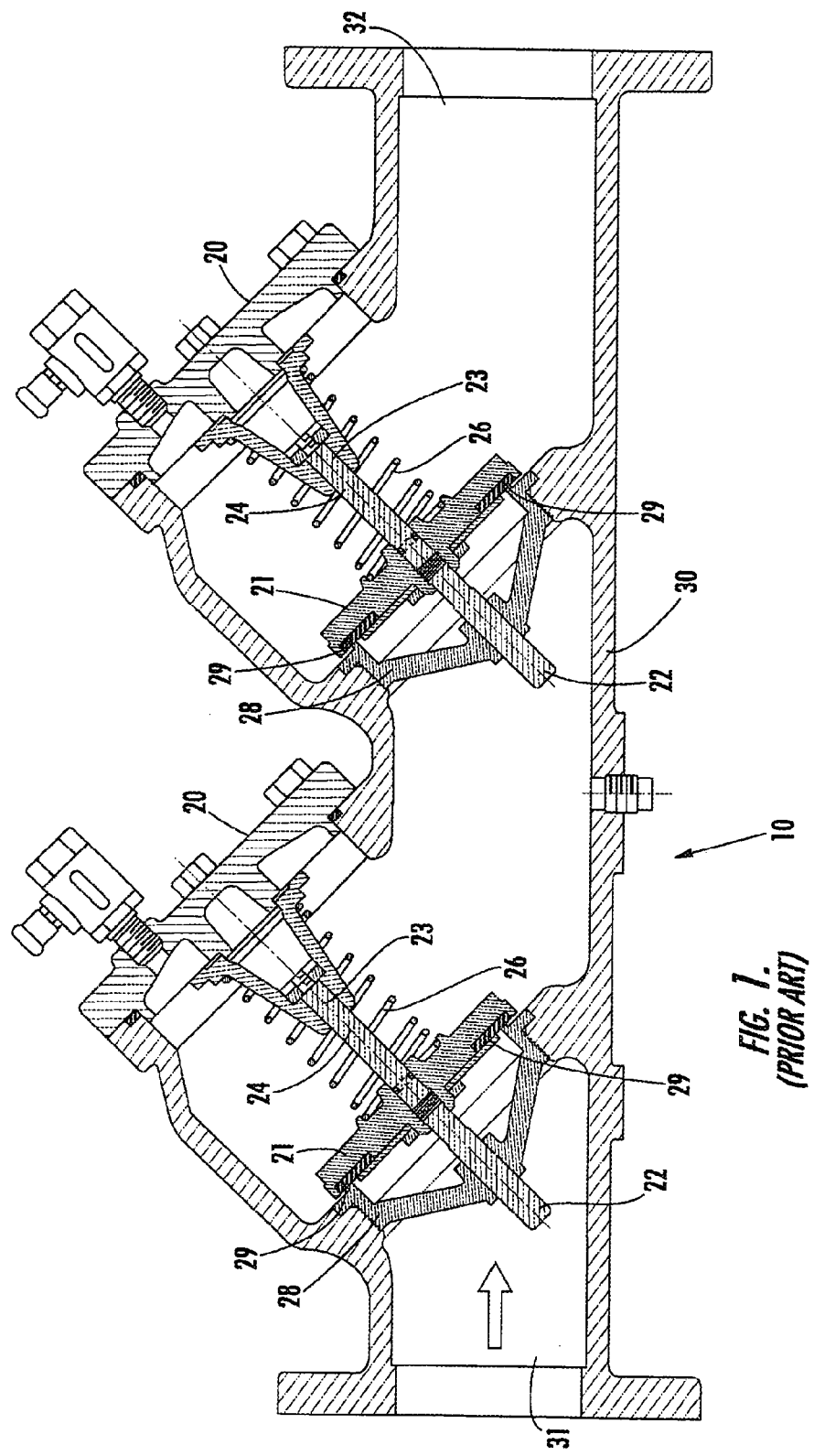
FIG. 1 is a vertical longitudinal cross-sectional view of a typical prior art poppet-type check valve.

Referring now specifically to the drawings, a prior art spring-loaded backflow preventer is illustrated in FIG. 1 and shown generally at reference numeral 10. The prior art backflow preventer 10 includes two identical poppet-style check valve assemblies 20 housed within a valve body 30 which has a fluid inlet 31 and a fluid outlet 32. Each valve assembly 20 is shown in a closed position, and includes a seal retainer 21 positioned intermediate with the first and second ends, 22 and 23, of a center guide stem 24. As is shown in FIG. 1, a compression spring 26 extends along the longitudinal axis of the guide stem 24 for biasing the seal retainer 21 in the closed position against a stationary valve seat 28. The seal retainer 21 includes a rubber seal 29 which seals against the seat 28 when the valve assembly 20 is closed. Each seat 28 is the only conduit in the valve body 30 through which fluid may pass, which causes each valve assembly 20 to be the only means of flow control in the prior art valve 10.

Figure 2:
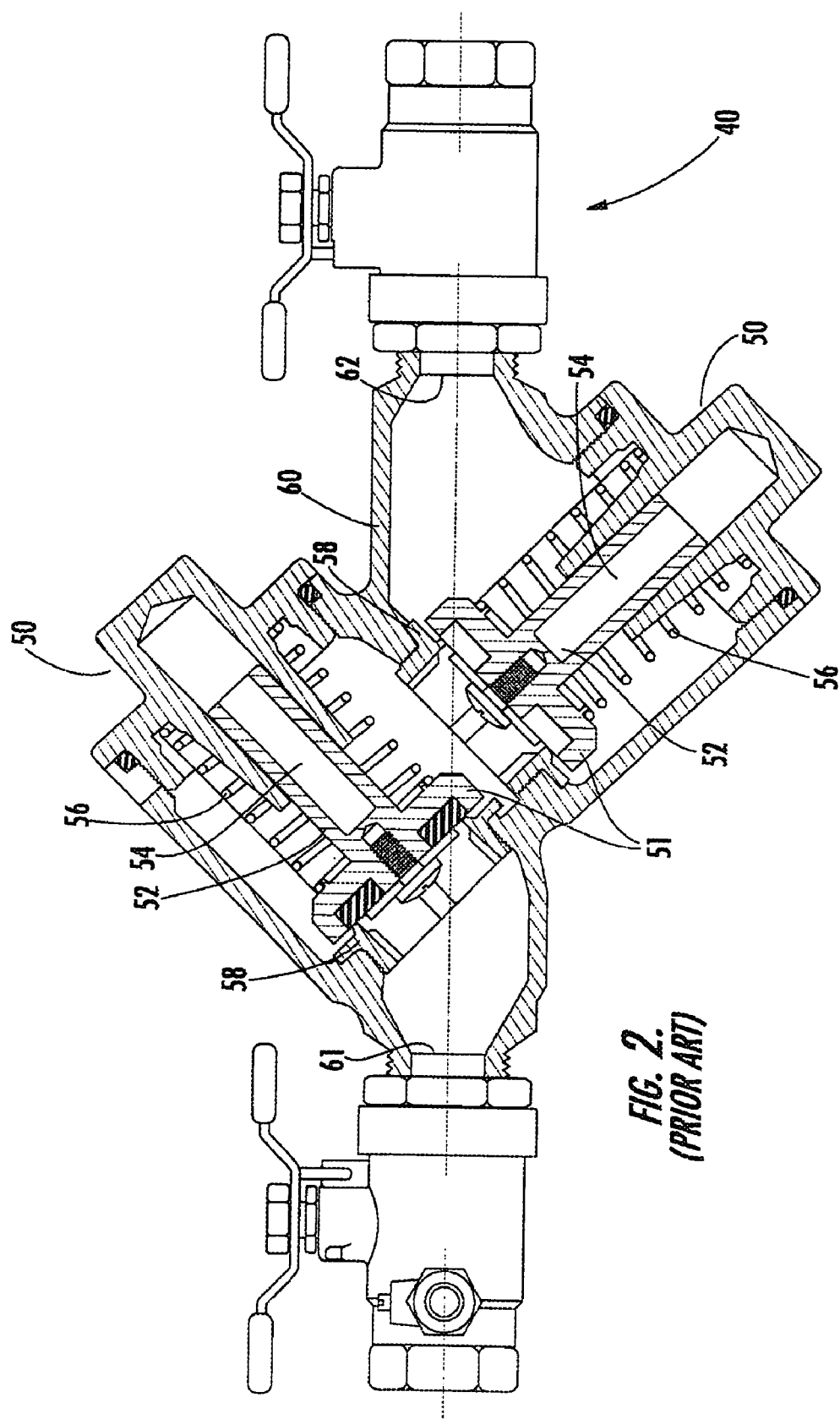
FIG. 2 is a vertical longitudinal cross-sectional view of another typical prior art poppet-type check valve.

Referring now to FIG. 2, another prior art spring-loaded backflow preventer is illustrated and shown generally at reference numeral 40. Like the prior art backflow preventer 10, the prior art backflow preventer 40 includes two identical poppet-style check valve assemblies 50 housed within a valve body 60. The valve body 60 has a fluid inlet 61 and a fluid outlet 62. Each valve assembly 50 includes a seal retainer 51 attached to the first end 52 of a center guide stem 54. A compression spring 56 extends along the longitudinal axis of the guide stem 54 for biasing the seal retainer 51 in a closed position against a stationary valve seat 58 when fluid is not flowing through the inlet 61 and against the seat 58.

While the components of the valve assemblies 20 and 50 are similar, the manner in which the assemblies 20 and 50 are positioned within the respective valve bodies 30 and 60 differs. In FIG. 1 the valve assemblies 20 are positioned so that the guide stems 24 are parallel to one another. In contrast, the valve assemblies 50 shown in FIG. 2 are positioned so that the guide stems 54 are perpendicular to each other. Despite this difference, the prior art backflow preventers 10 and 40 share the well-known problem of creating excess dynamic head loss, which increases proportionately as the rate of fluid flow increases. This problem is caused not only by the naturally-occurring force of friction between the surfaces of the backflow preventer components and the fluid as it contacts those components, but also by redirecting the path of the fluid through and around any one of the check valve assemblies 20 and 50. Furthermore, the problem of increased dynamic head loss is exacerbated by the linear alignment of the compression springs 26 and 56 along the longitudinal axes of respective guide stems 24 and 54. Using the prior art backflow preventer 10 shown in FIG. 1 as an example, positioning each compression spring 26 along the longitudinal axis of the guide stem 24 causes the spring 26 to compress and exert an increasing linear force on the seal retainer 21 as the seal retainer 21 opens. This increased linear force causes the dynamic head loss to increase. While the effects of the force of friction and of redirecting the path of the fluid discussed above should not be disregarded, the increased linear force created by the positioning of the springs 26 and 56 along the longitudinal axes of respective guide stems 24 and 54 is the primary factor contributing to the dynamic head loss problems inherent in the prior art valves shown in FIGS. 1 and 2.

Figure 3:
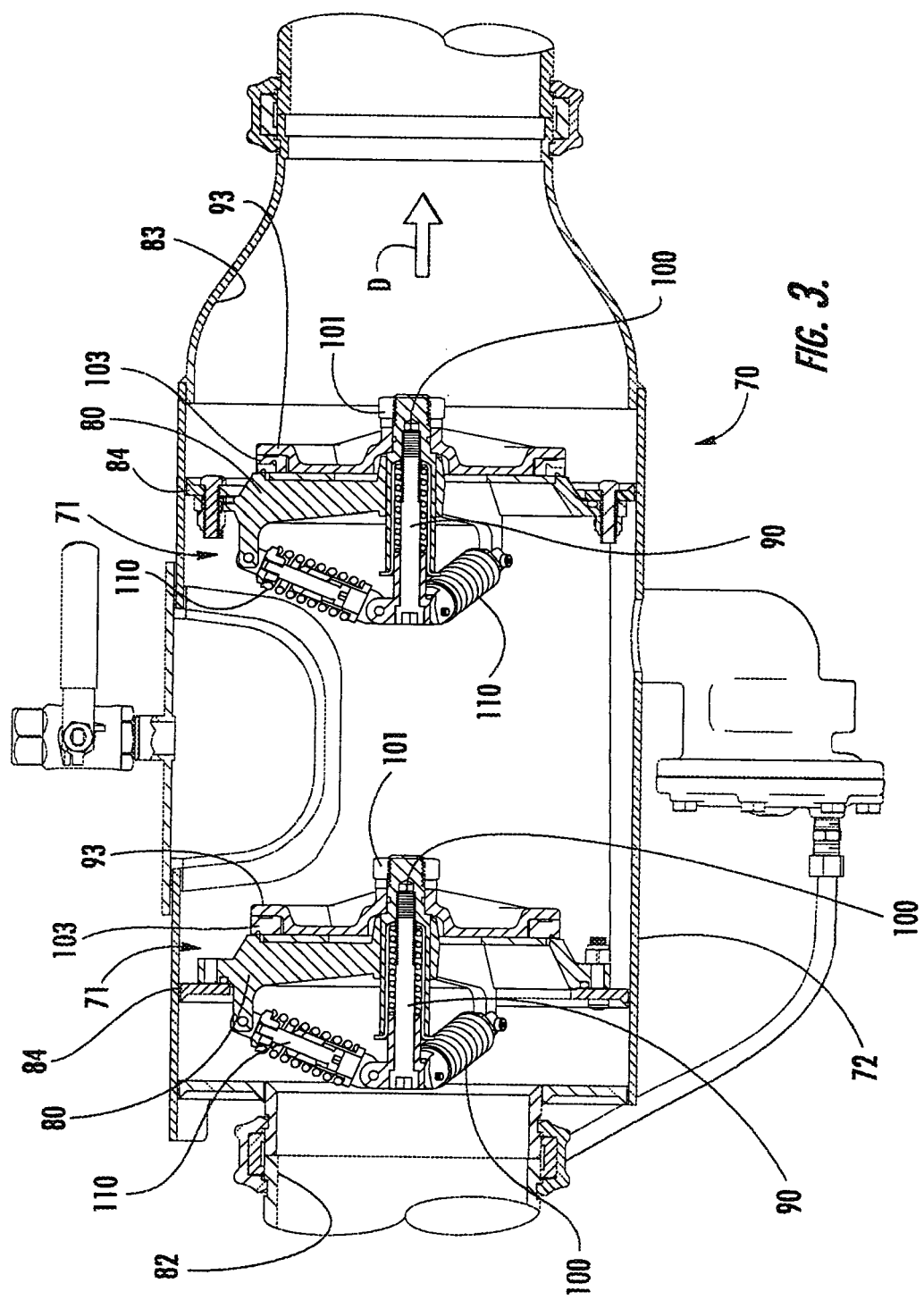
FIG. 3 is a cut-away, vertical, longitudinal cross-sectional view of a radially loaded, poppet-type check valve according to an embodiment of the present invention, positioned in a no-flow condition.

Referring now to FIG. 3, a radially loaded, poppet-type backflow preventer according to one preferred embodiment of the present invention is illustrated and shown generally at reference numeral 70. The backflow preventer 70 is based on the backflow preventer 70 shown in U.S. Pat. No. 6,443,184, with the added novel features discussed below.

The backflow preventer 70 includes two identical check valve assemblies 71 positioned in series within the same valve housing 72. As shown in FIGS. 1 and 2, placing two check valves within a valve housing is well known in the art, and will thus not be described in detail.

Each valve assembly 71 includes a valve seat 80 frictionally positioned within the valve housing 72. Fluid which is to be controlled by the valve assemblies 71 normally flows through the valve seats 80 from inlet conduit 82 and outlet conduit 83 upstream to downstream in the direction ("D") shown. An o-ring 84 is positioned in an annular o-ring groove and forms a fluid seal between the valve seat 80 and the valve housing 72. The valve assemblies 71 also each include a horizontally-oriented stem 90 mounted in the interior of the valve housing 72. A seal retainer 93 is positioned on one end of stem 90 and engages the valve seat 80. A seal retainer 93 is attached to the stem 90 by a threaded end 100. The threaded end 100 is received in a threaded nut 101 and secures the bolt 100 to the seal retainer 93. An o-ring seal 103 is positioned in an annular o-ring groove in the seal retainer 93 and forms a fluid seal with the valve seat 80.

Figure 4:
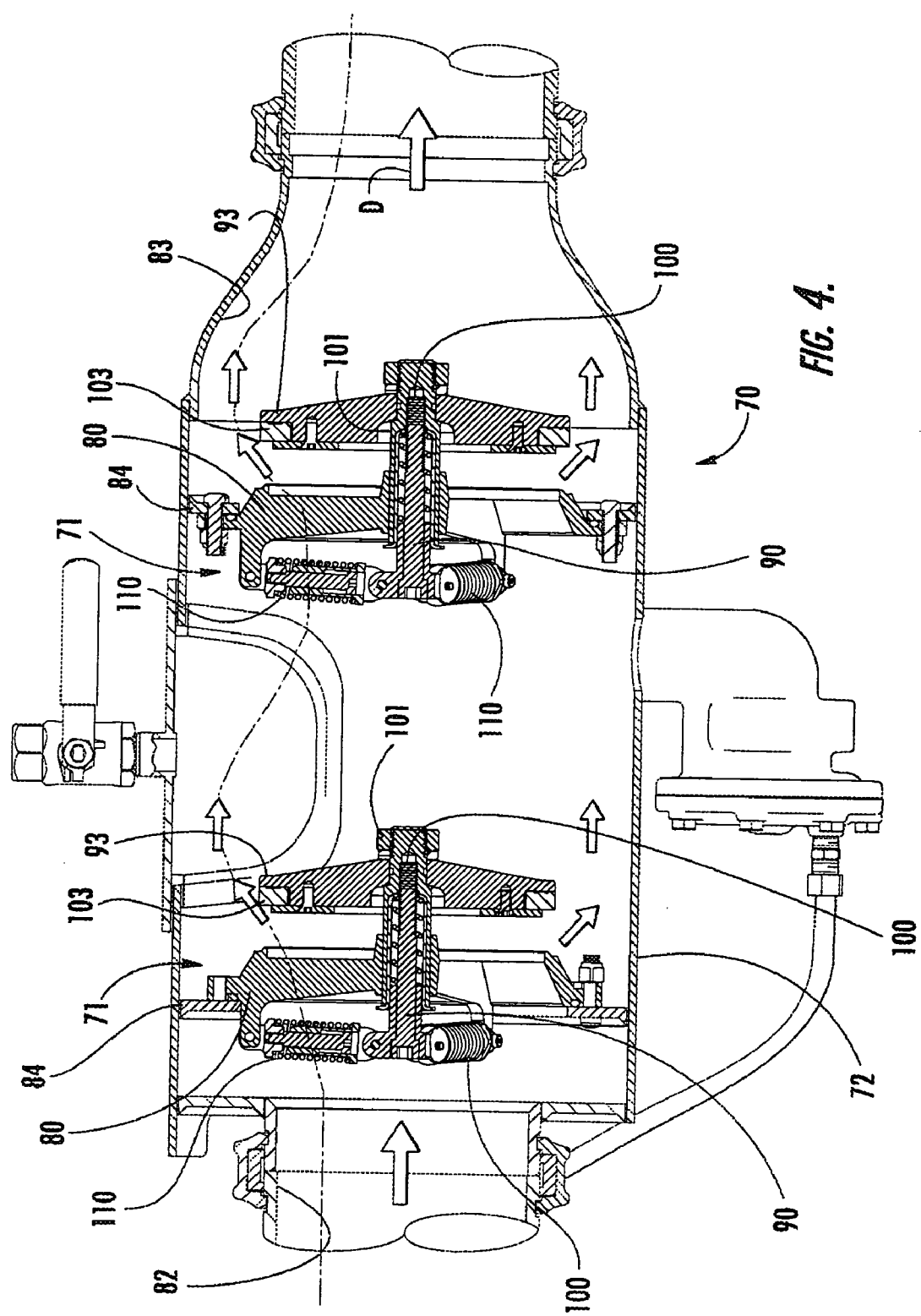
FIG. 4 is a cut-away, vertical, longitudinal cross-sectional view of one of the check valve assemblies shown in FIG. 3 in a full-flow condition.
Figure 5:
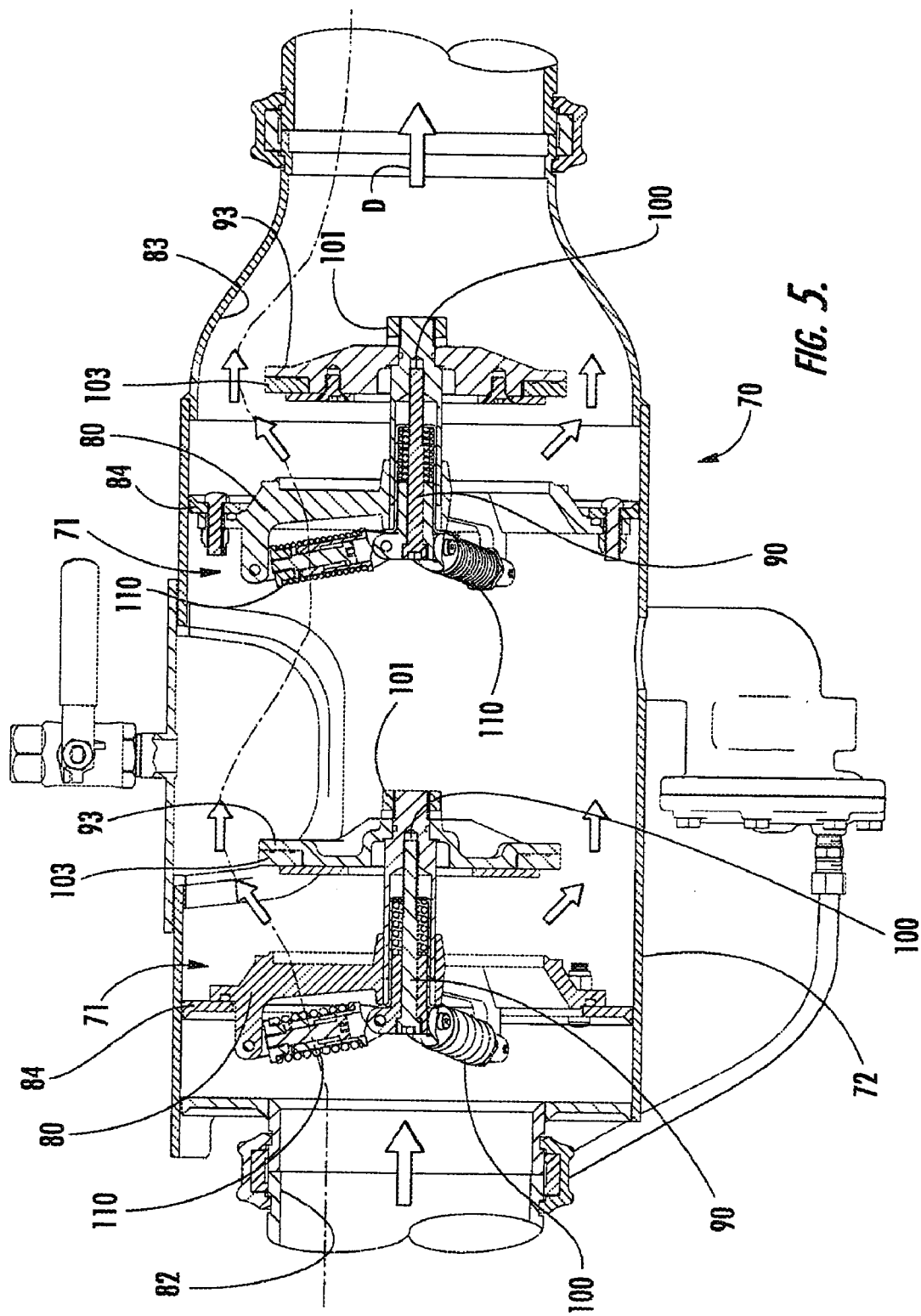
FIG. 5 is a cut-away vertical longitudinal cross-sectional view of the check valve assemblies in an open, full-flow condition.

The seal retainer 93 is movable between a closed position shown in FIG. 3, in which the seal retainer 93 engages and seals against the valve seat 80, and an intermediate position shown in FIG. 4, in which the stem 90 has moved in a direction downstream from the valve seat 80 to an open, full-flow position shown in FIG. 5. Note in FIG. 5 that the increased stroke of the stem 90 produces a smoother flow path resulting in better flow characteristics. The primary benefit achieved is reduced dynamic pressure loss—a benefit widely known in the valve industry but hard to achieve.

The seal retainers 93 move in and out of engagement with the valve seat 80 under the influence of three spaced-apart, pivotally-mounted springs 110. Although any suitable spring may be used, each spring 110 is preferably a compression spring. As shown in FIGS. 1 and 2 above, the general use of compression springs in backflow preventers is well known in the art, as is the particular mounting arrangement of the springs 110, whether by hinges, ball and socket assemblies or otherwise, and are not further discussed in detail.

Figure 6:
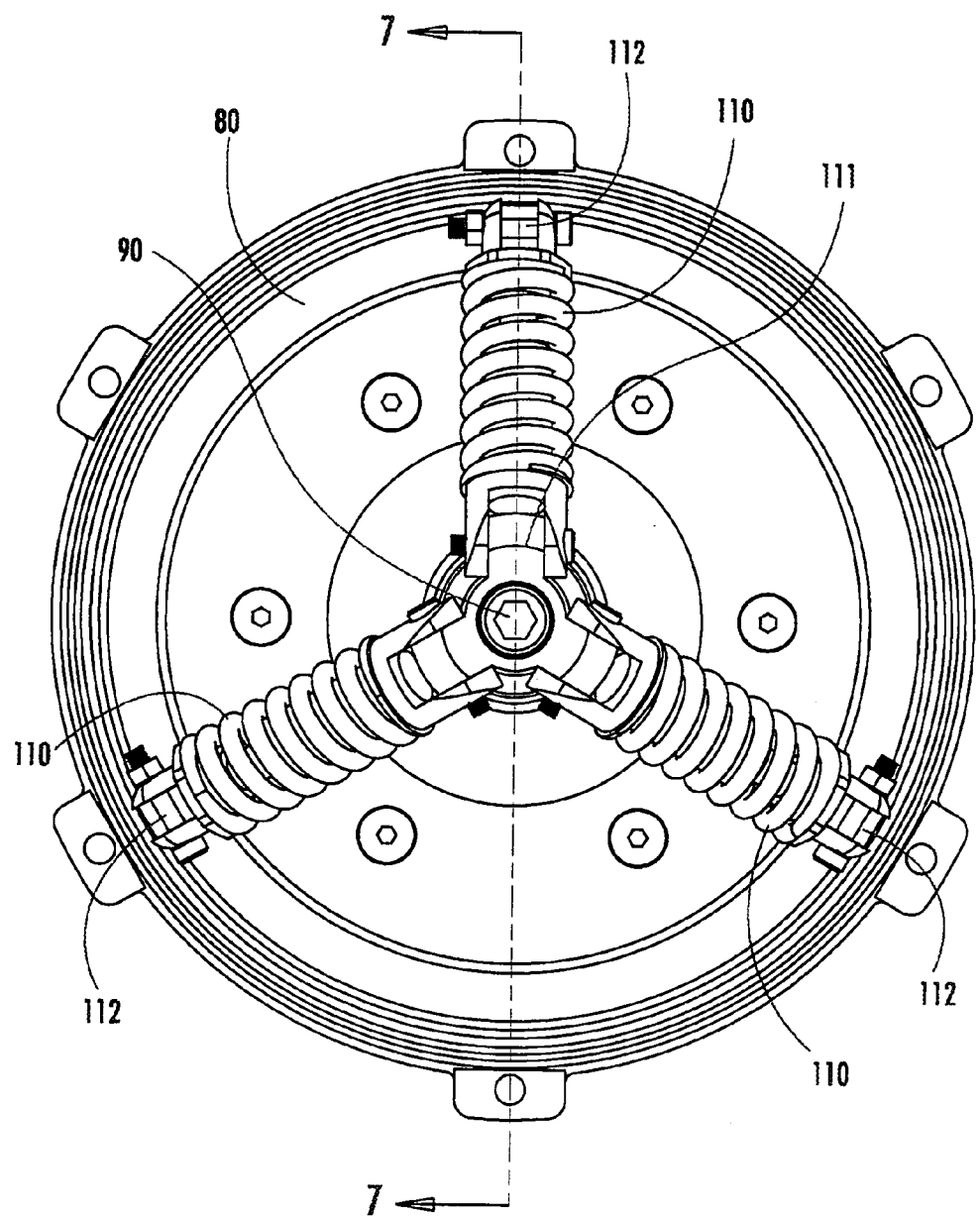
FIG. 6 is a downstream end view of the check valve assembly in a closed, no-flow condition.
Figure 7:
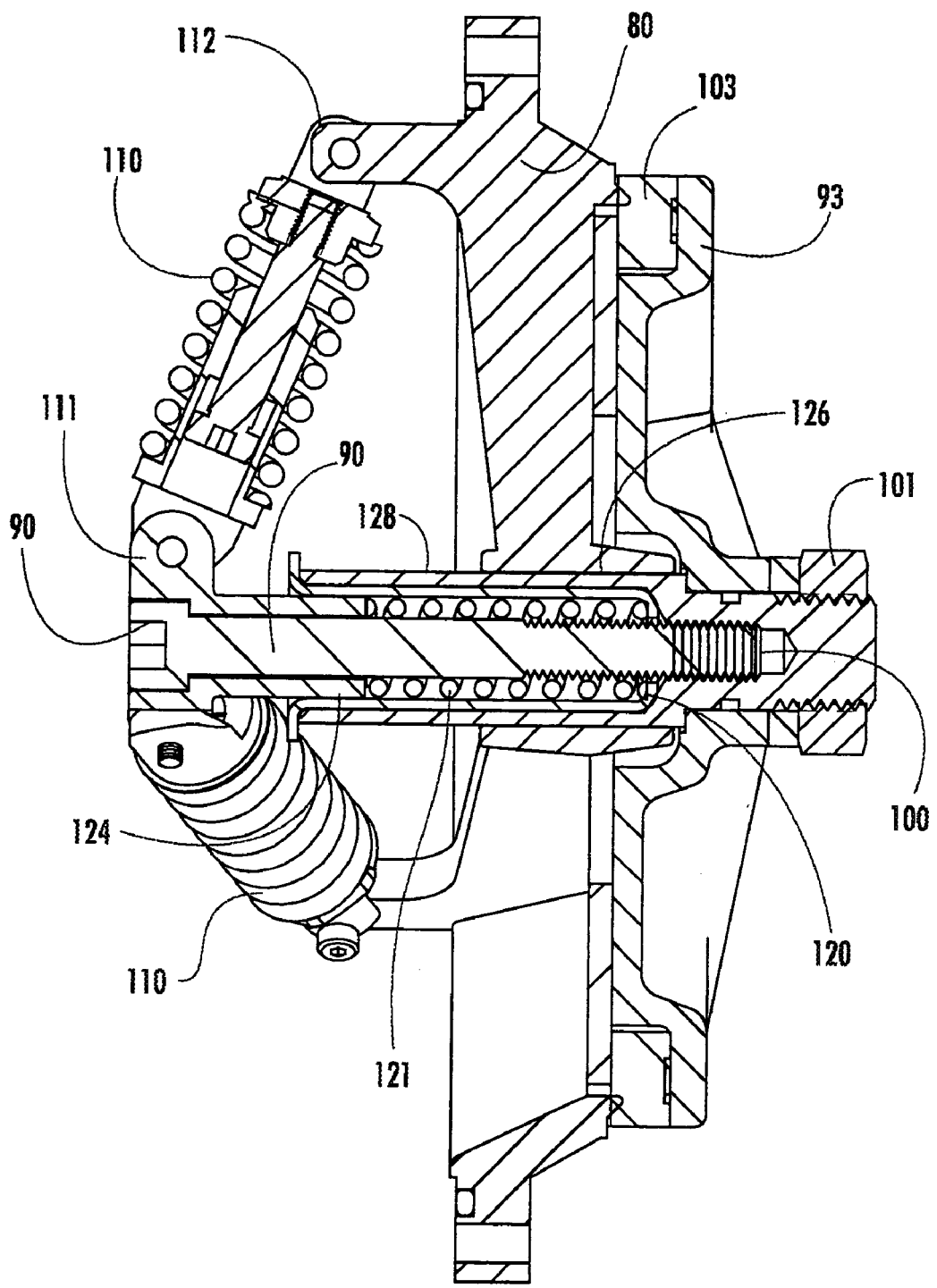
FIG. 7 is a cross-section taken along lines A—A of FIG. 6 showing the check valve assembly in a closed, no-flow condition.

Referring now to FIGS. 6 and 7, the springs 110 each include an inner hinge assembly 111 and an outer hinge assembly 112, allowing the springs 110 to pivot by their respective inner and outer ends. The inner hinge assembly 111 is carried by the upstream end of the stem 90 so that axial movement of the stem 90 causes the springs 110 to pivot. This pivoting motion is transmitted to the outer hinge assemblies 112.

Figure 8:
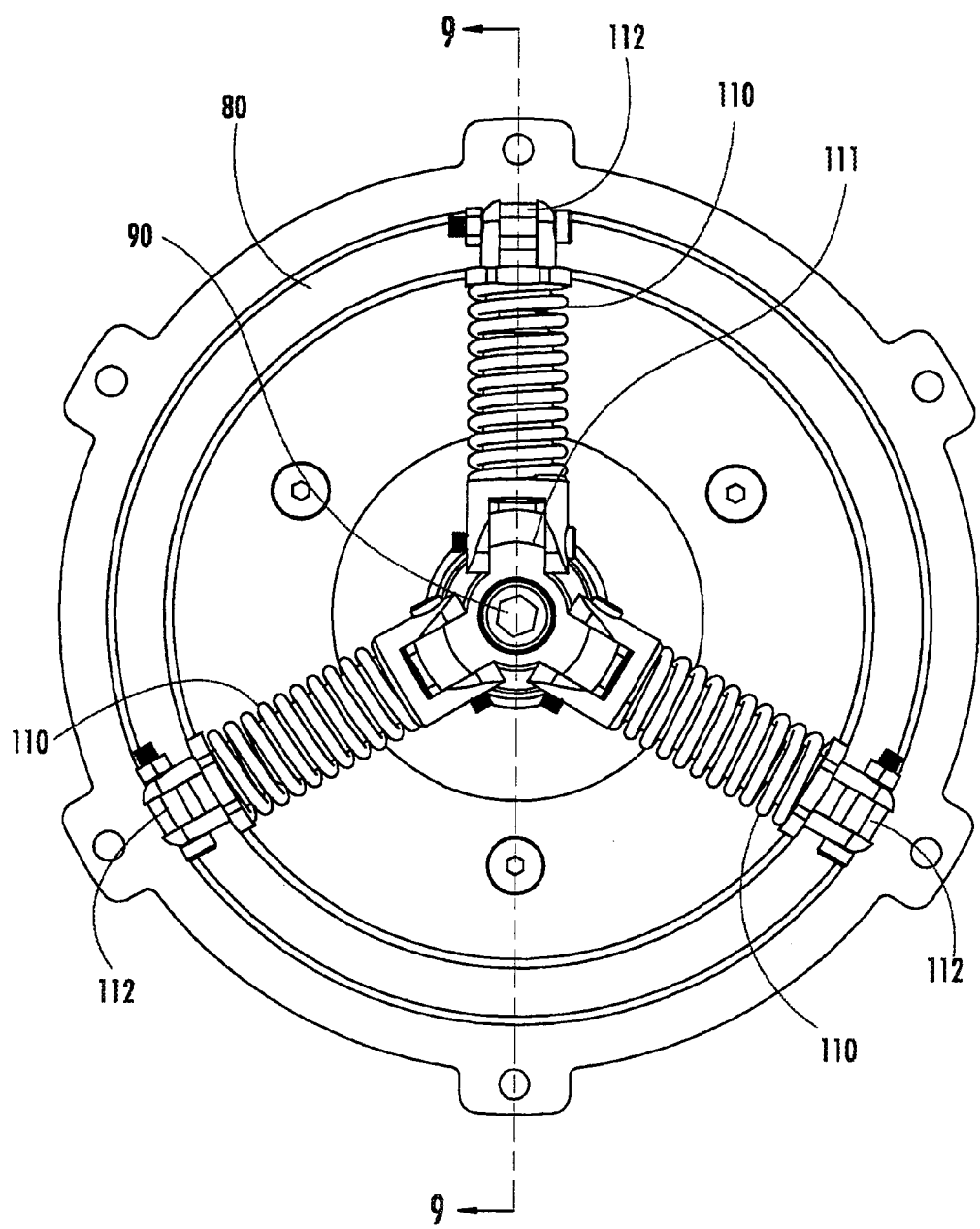
FIG. 8 is a downstream partial end view of the check valve assembly in an intermediate position condition.
Figure 9:
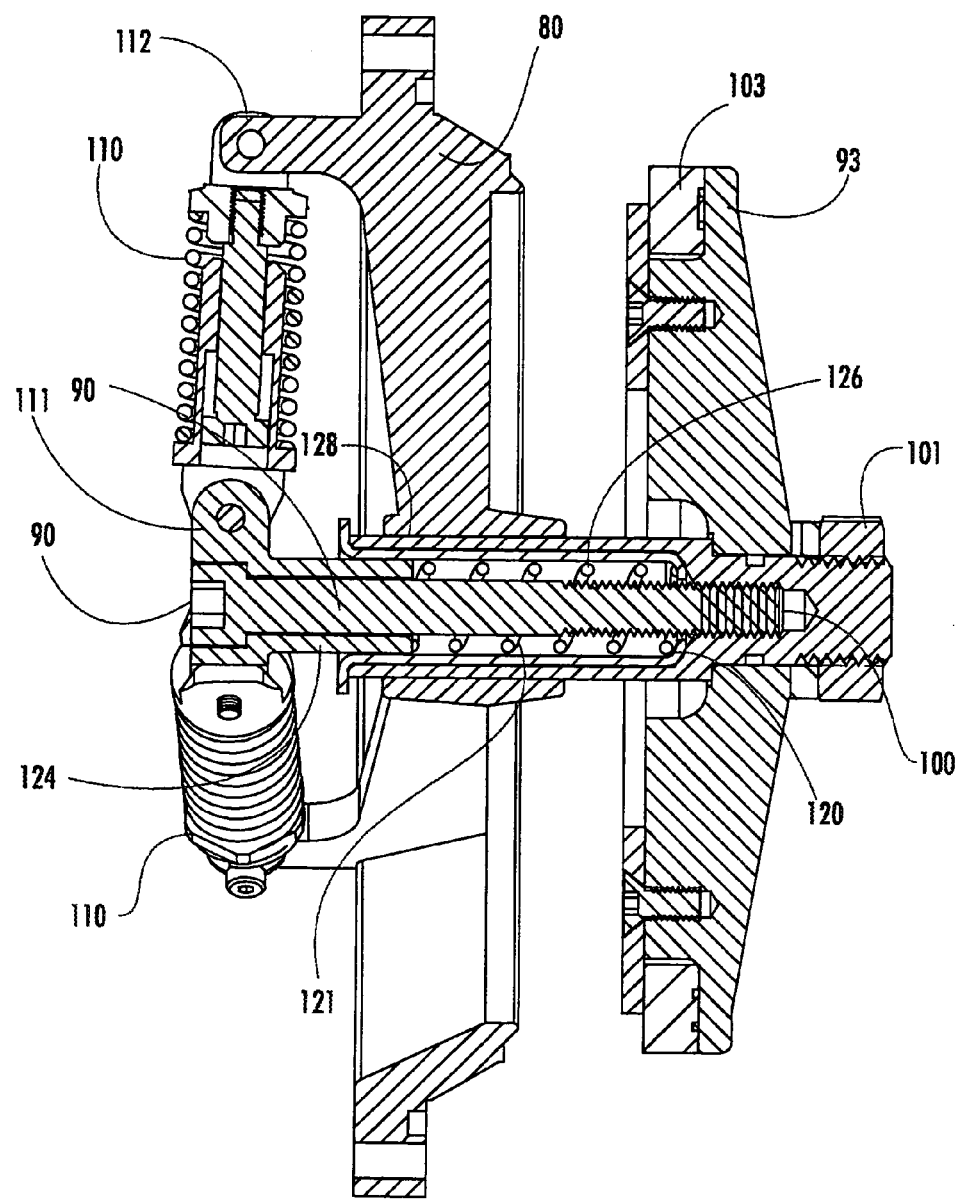
FIG. 9 is a cross-section taken along lines A—A of FIG. 8 showing the check valve assembly in a partially-open condition.
Figure 10:
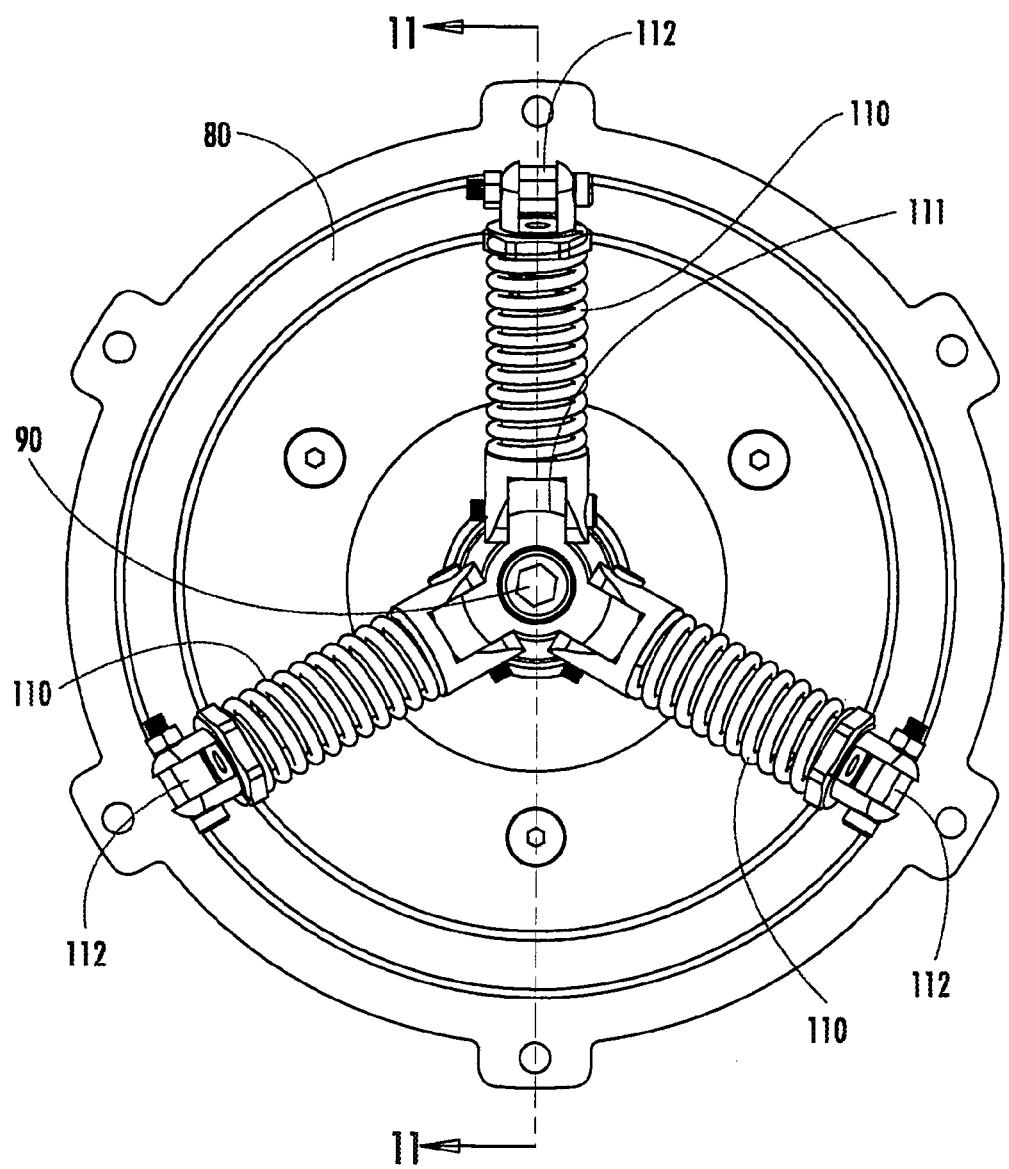
FIG. 10 is a downstream partial end view of the check valve assembly in a full open flow condition.
Figure 11:
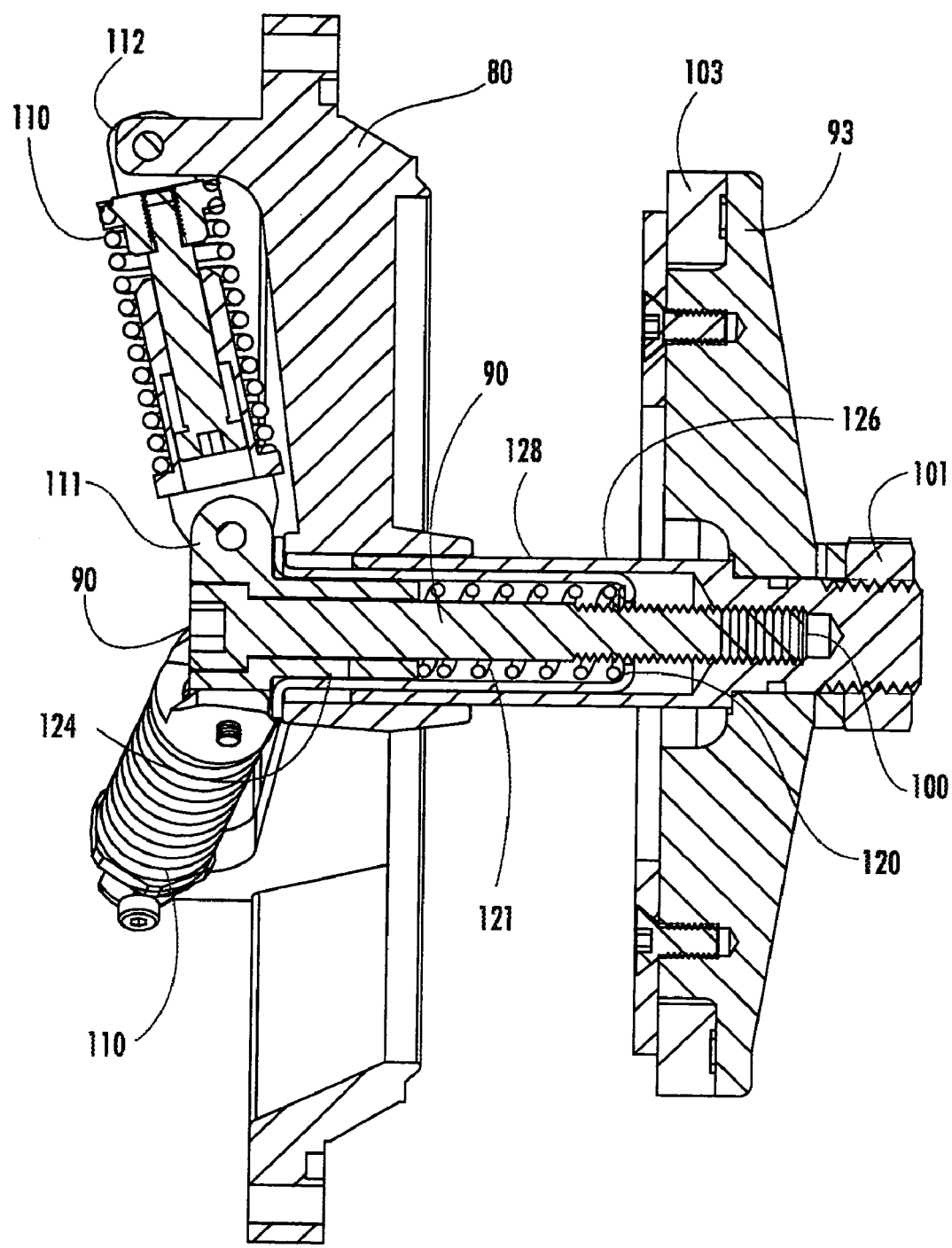
FIG. 11 is a cross-section taken along lines A—A of FIG. 10 showing the check valve assembly in a full open flow condition.

By reference to FIGS. 6–11, the relative movement between the valve seat 80 and the seal retainer 93 can be observed. FIGS. 6 and 7 show the position of the seal retainer 93 in the closed, no-flow position. FIGS. 8 and 9 show the position of the seal retainer 93 in an intermediate position as the seal retainer 93 is either opening or closing. FIGS. 10 and 11 show the seal retainer 93 in the open, full-flow condition.

As described fully in applicant's U.S. Pat. No. 6,443,184, the spring tension of the springs 110 is calibrated to be sufficient to hold the seal retainer 93 in sealing relation during no fluid flow or fluid flow below a certain predetermined threshold, as is shown in FIGS. 6 and 7. A feature of the valve disclosed herein is that the springs 110 are in their position of greatest compression in the position shown in FIG. 9. This means that not only will the springs 110 provide an assist to the closing of the seal retainer 93 against the valve seat 80 from the position shown in FIG. 9 to the position shown in FIG. 7, but also will provide an assist to the movement of the seal retainer 93 from the partially open to the full open position from FIG. 9 to FIG. 11. This desirable feature provides a secure, continuous full open position during normal operation and flow conditions and assists in preventing unwanted closure of the seal retainer 93 during erratic flow conditions.

However, there are other flow conditions that have shown to be conducive to the seal retainer 93 remaining open in marginal low flow situations where ideally the seal retainer 93 should close to prevent possible backflow conditions.

This condition is prevented by the addition of a biasing element that provides an assist in overcoming the force of the springs 110 in the downstream direction in the flow conditions shown in FIG. 11. The stem 92 is surrounded by a return spring 120. Ideally, the return spring 120 should not be overly heavy and should only produce the load necessary to return the seal retainer 93. The amount of load required by the return spring 120 and the travel of the spring 120, and consequently the spring rate, is derived from FIG. 13.

The return spring 120 is captured within a concentric void 121 defined by a collar assembly that includes a collar 124 carried on the upstream end of the stem 92. The downstream end of the collar 124 defines a shoulder 125 against which the upstream end of the return spring 120 rests. As observed in FIGS. 6, 8 and 10, the collar 124 moves with the springs 110 and relative to the valve seat 80.

The collar assembly also includes a collar sleeve 126 positioned for sliding movement within a collar tube 128. The collar tube 128 is threaded into the seal retainer 93 and moves in unison with the seal retainer 93. The collar sleeve 126 retains the return spring 120 within void 121.

During valve operation the return spring 120 and collar tube 128 are passive in the positions shown in FIGS. 9 and 11, moving in unison with the stem 90 and providing no significant biasing force in either the upstream or downstream direction. At the point during movement of the seal retainer 93 that the upstream end of the collar sleeve 126 engages the upstream end of the valve seat 80, further downstream movement of the seal retainer 93 into the full open position shown in FIG. 11 compresses the return spring 120 by holding the collar sleeve 126 in a fixed position while the collar 124 slides further into the collar tube 128. Compare the position of the collar sleeve in FIGS. 9 and 11, noting particularly the void 130 immediately downstream of the collar sleeve 126, indicating the degree of axial compression of the return spring 120.

The axial biasing component of the return spring 120 thus provides an upstream biasing force that partially counteracts the downstream biasing force of the springs 110, but only when the seal retainer 93 is between the positions shown in FIG. 11. The effect is to add an upstream biasing component that partially counteracts the downstream biasing component of the springs 110 when the seal retainer 93 is in the full open position. A drop in flow pressure sufficient to cause an incipient upstream, closing movement of the seal retainer 93 is assisted by the upstream bias of the return spring 120 sufficient to overcome any tendency, inertial, as the result of sticking of the stem 92 or sealing surface, or otherwise, that might otherwise prevent prompt and complete closure of the seal retainer 93 to the position shown in FIG. 7.

Figure 13:
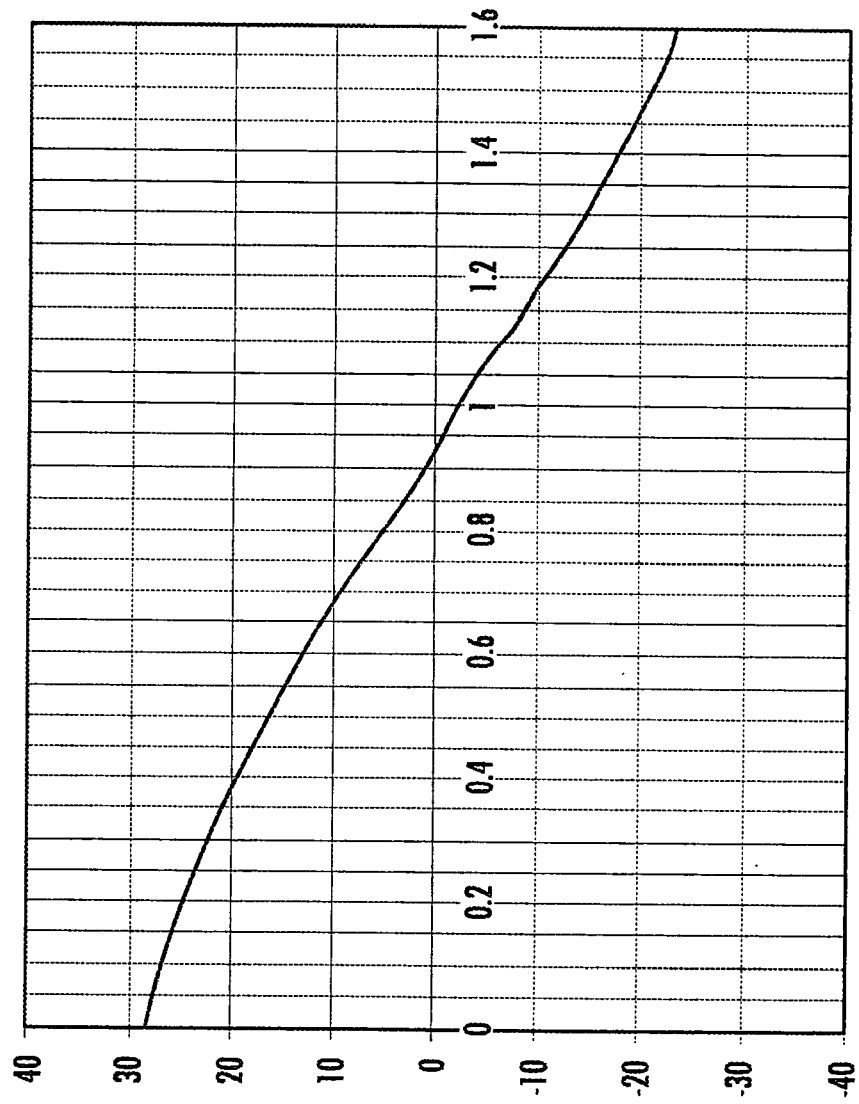
FIG. 13 is a chart showing axial load using a radially-loaded poppet with over-travel.
Figure 14:
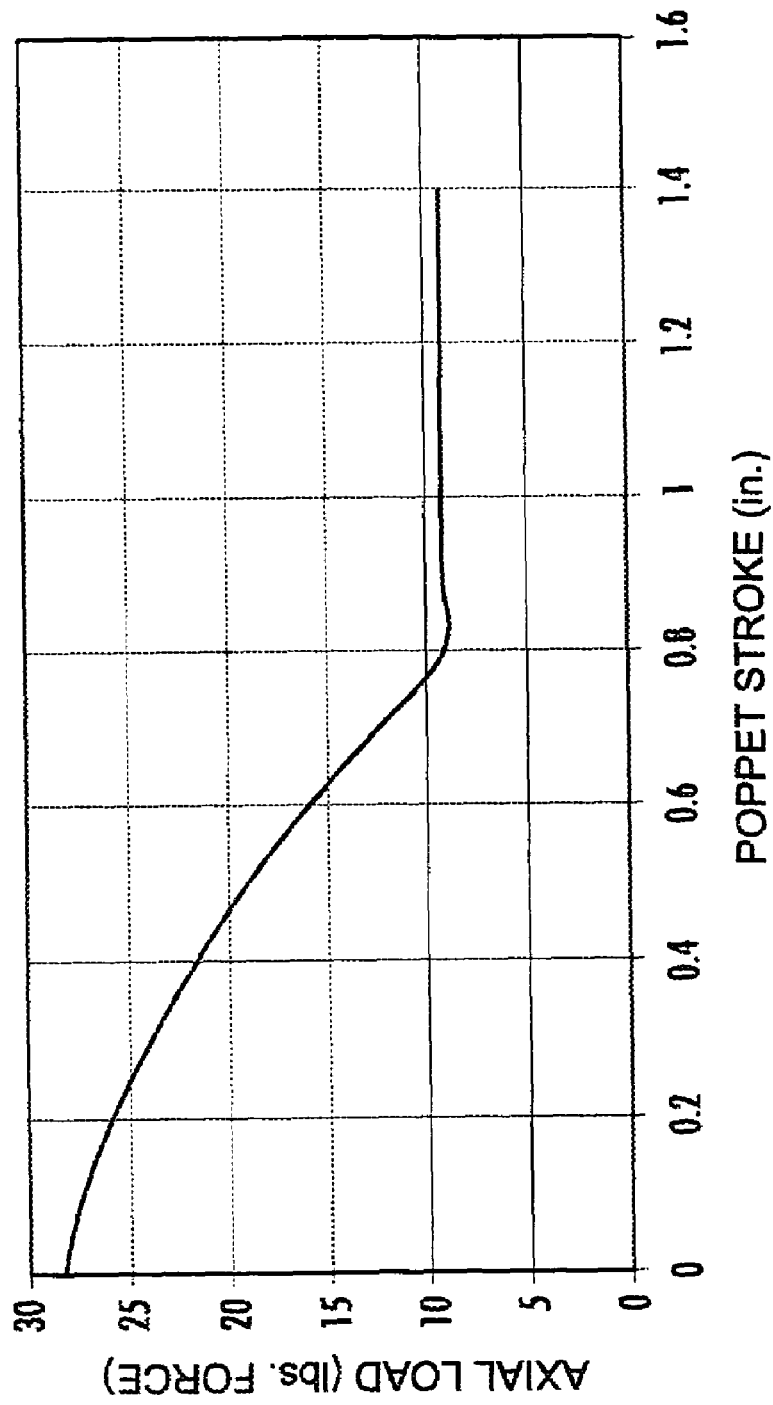
FIG. 14 is a chart showing poppet load in the axial direction with an over-travel spring installed.

Having described a preferred embodiment of the invention, further explanation of the function and improved characteristics is now explained with reference to FIGS. 12–14.

Figure 12:
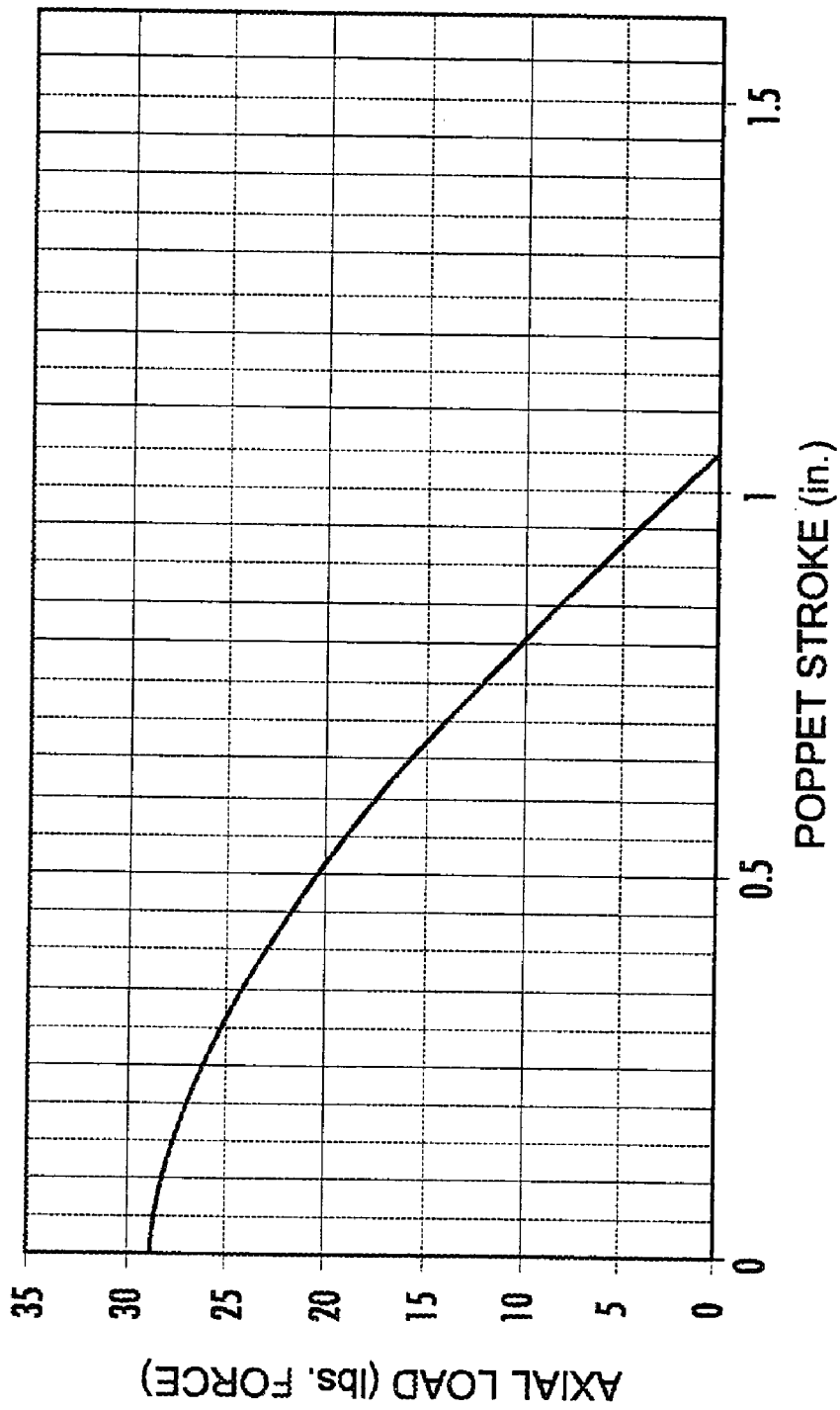
FIG. 12 is a chart showing axial load versus stroke for a radially-loaded poppet valve.

As is shown in FIG. 12, in order to produce an axial load that immediately diminishes as flow commences, the valve 70 must have springs 110 positioned at an ideal angle. The ideal angle is typically less than 30 degrees. The lower the angle, the quicker the fall-off of the axial load. The radially-loaded poppet valve therefore produces a relatively short poppet stroke because the spring arrangement moves from approximately 30 degrees to close to zero, as shown in FIG. 12.

As described above, the over-travel feature provided by the return spring 120 allows the seal retainer 93 to stroke past the neutral, no load position without getting stuck in the open position. The need for the return spring 120 is demonstrated as the radial spring load on the poppet, once past the neutral position causes axial load in the opposite direction. This opposite load prevents under certain circumstances the seal retainer 93 from returning to the closed position. See FIG. 13.

A poppet-type valve with a closure assist feature is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A poppet-type check valve for controlling fluid flow, comprising:
    (a) a valve housing having an interior for permitting fluid flow from an upstream side to a downstream side thereof;
    (b) at least one valve assembly disposed within the interior of the valve housing for controlling the fluid flow therethrough, said valve assembly including:
        (i) a valve seat positioned in the interior of the valve housing;
        (ii) a seal retainer positioned in the interior of the valve housing downstream from the valve seat and mounted on a stem, said seal retainer and said stem axially moveable away from the valve seat in response to fluid flow in a downstream direction at a predetermined flow rate, and axially moveable towards and into sealing engagement with the valve seat in response to a downstream fluid flow at a flow rate less than the predetermined flow rate;
        (iii) a plurality of springs pivotally mounted in the interior of the valve housing interconnecting the valve housing and stem for normally maintaining the seal retainer in sealing engagement with the valve seat in the absence of said predetermined fluid flow rate, said springs positioned in radial opposition to one another and extending outwardly from the stem in the downstream direction to cause the seal retainer to move away from the valve seat in response to fluid flow in the downstream direction, thereby increasing the force of the stem on the springs and causing the springs to pivot and compress to produce a diminishing resultant spring load on the stem; and
        (iv) a return member mounted on the stem for providing a return motion to the plurality of springs, the biasing force of the return member providing an assist to the motion of the stem in the upstream direction upon a predetermined reduction in fluid flow to assist in returning the seal retainer into sealing engagement with the valve seat.

2. A poppet-type check valve for controlling fluid flow, comprising:
    (a) a valve housing having an interior for permitting fluid flow from an upstream side to a downstream side thereof;
    (b) at least one valve assembly disposed within the interior of the valve housing for controlling the fluid flow therethrough, said valve assembly including:
        (i) a valve seat positioned in the interior of the valve housing;
        (ii) a stem guide mounted on a downstream side of said valve seat and carrying an axially-mounted stem mounted for sliding movement therein;
        (iii) a seal retainer positioned in the interior of the valve housing downstream from the valve seat and mounted on the stem, said seal retainer and said stem axially moveable away from the valve seat in response to fluid flow in a downstream direction at a predetermined flow rate, and axially moveable towards and into sealing engagement with the valve seat in response to a downstream fluid flow at a flow rate less than the predetermined flow rate;

(iv) a plurality of springs pivotally mounted in the interior of the valve housing interconnecting the valve housing and stem for normally maintaining the seal retainer in sealing engagement with the valve seat in the absence of said predetermined fluid flow rate, said springs positioned in radial opposition to one another and extending outwardly from the stem in the downstream direction to cause the seal retainer to move away from the valve seat in response to fluid flow in the downstream direction, thereby increasing the force of the stem on the springs and causing the springs to pivot and compress to produce a diminishing resultant spring load on the stem; and (v) a return member mounted on the stem for providing a return motion to the plurality of springs, the biasing force of the return member providing an assist to the motion of the stem in the upstream direction upon a predetermined reduction in fluid flow to assist in returning the seal retainer into sealing engagement with the valve seat.

3. A poppet-type check valve according to claims 1 or 2, wherein each of said springs is positioned for being axially compressed and expanded between two angles responsive to the movement of the seal retainer, each of said angles oblique to the direction of fluid flow through the valve housing.

4. A poppet-type check valve according to claim 3, wherein said valve assembly includes three springs, each of said springs having first and second ends.

5. A poppet-type check valve according to claim 4, wherein said springs are positioned in equally-spaced relation to one another.

6. A poppet-type check valve according to claim 5, wherein said first ends are positioned on the stem in equally-spaced relation to one another, and said second ends are positioned 120 degrees apart from one another and extend downstream from said first ends.

7. A poppet-type check valve according to claim 1 or 2, wherein said return member comprises a return spring positioned concentrically around the stem downstream from the plurality of springs and upstream from the seal retainer.

8. A poppet-type check valve according to claim 7, wherein said return spring is positioned and captured within a collar assembly mounted concentrically around the stem downstream from the plurality of springs and upstream from the seal retainer, the collar assembly mounted for sliding movement on the stem between:

(a) a sealing position wherein the seal retainer is sealed against the valve seat and the return spring is in an expanded condition and the collar assembly is out of biasing contact with the stem; and (b) a flow position wherein the seal retainer is spaced-apart from the valve seat to permit fluid flow through the valve, the return spring is in a compressed condition and the collar assembly is in engagement with the springs for exerting a biasing force against the stem in an upstream direction for providing an assist to the springs in closing the valve responsive to a drop in flow pressure through the valve.

9. A poppet-type check valve according to claim 1 or 2, wherein each of said springs are mounted on first and second ends by respective first and second hinges.

10. A poppet-type check valve according to claim 9, wherein said first hinge is carried by said stem and said second hinge is carried peripherally by the valve seat.

\* \* \* \* \*